United States Patent
Hu

(10) Patent No.: US 10,609,346 B2
(45) Date of Patent: Mar. 31, 2020

(54) METHOD OF STARTING INFORMATION-CAPTURING DEVICE

(71) Applicant: GETAC TECHNOLOGY CORPORATION, Hsinchu County (TW)

(72) Inventor: Chien-Chih Hu, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 16/024,690

(22) Filed: Jun. 29, 2018

(65) Prior Publication Data
US 2020/0007828 A1   Jan. 2, 2020

(51) Int. Cl.
*H04N 7/18* (2006.01)
*H04N 5/77* (2006.01)

(52) U.S. Cl.
CPC .............. *H04N 7/188* (2013.01); *H04N 5/77* (2013.01)

(58) Field of Classification Search
CPC .................. H04N 7/188; H04N 5/77
See application file for complete search history.

(56) References Cited

U.S. PATENT DOCUMENTS

| 9,454,682 | B2* | 9/2016 | Tiedemann | H04L 1/0079 |
| 2013/0222133 | A1* | 8/2013 | Schultz | G08G 1/205 |
| | | | | 340/539.13 |
| 2016/0286172 | A1* | 9/2016 | Weng | H04N 7/183 |
| 2018/0014389 | A1* | 1/2018 | Lim Chi Cheung | G06F 3/03547 |
| 2018/0027363 | A1* | 1/2018 | Renkis | H04W 4/70 |
| | | | | 370/254 |
| 2018/0061200 | A1 | 3/2018 | Hu | |
| 2018/0182215 | A1 | 6/2018 | Jen | |

FOREIGN PATENT DOCUMENTS

EP   2983357 A2   2/2016

* cited by examiner

*Primary Examiner* — Mishawn N. Hunter

(57) ABSTRACT

A method of starting an information-capturing device includes: receiving an event message including a destination information by a near-field communication technology, comparing a first identification code of the information-capturing device with the dedicated identification code specified by the destination information contained in the event message, starting the information-capturing device to capture ambient data if the first identification code matches the dedicated identification code specified by the destination information contained in the event message, and broadcasting the event message by the near-field communication technology if the first identification code does not match the dedicated identification code specified by the destination information contained in the event message.

16 Claims, 14 Drawing Sheets

METHOD OF STARTING INFORMATION-CAPTURING DEVICE

BACKGROUND OF THE INVENTION

Field of the Invention

The present disclosure relates to technologies of controlling information-capturing devices and, more particularly, to a method of starting an information-capturing device.

Description of the Prior Art

In general, information-capturing devices are portable and capable of capturing media data, such as images and sounds. Owing to increasing public awareness of information security, portable information-capturing devices, capable of being easily carried and capturing information in real time, function as security-related auxiliary devices and have wide application. For instance, police officers on duty carry information-capturing devices to assist with policing. Furthermore, media data recorded on the information-capturing devices can serve evidential purposes. In practice, users operate start switches on portable information-capturing devices to enable the portable information-capturing devices to capture information in real time.

SUMMARY OF THE INVENTION

However, in emergency situations, it is either too late for users to start the information-capturing devices by hand or too late for crucial images and/or sounds to be captured with the started information-capturing devices. Furthermore, every police officer on duty usually carries one and only one information-capturing device; as a result, media data captured with the information-capturing device are shot from a single angle rather than sufficiently multiple angles. Moreover, the odds are that some police officers may not even carry any information-capturing devices and thus cannot capture media data while on duty. Last but not least, some information-capturing devices are not capable of networking and thus cannot inform a remote server of an event as soon as the event occurs.

In view of the aforesaid drawbacks of the prior art, the present disclosure provides a method of starting an information-capturing device wirelessly, as opposed to manually, as soon as an event occurs in the vicinity of the information-capturing device, so as for the information-capturing device to record ambient images and/or sounds automatically and instantly.

In some embodiments, the present disclosure provides a method of starting an information-capturing device capable of informing a remote server of an event through a neighboring device which supports a remote communication technology.

In an embodiment, a method of starting an information-capturing device, comprising the steps of: receiving an event message including a destination information by a near-field communication technology; comparing a first identification code of the information-capturing device with the dedicated identification code specified by the destination information contained in the event message; starting the information-capturing device so as for the information-capturing device to begin capturing ambient data, if the first identification code matches the dedicated identification code specified by the destination information contained in the event message; and broadcasting the event message by the near-field communication technology if the first identification code does not match the dedicated identification code specified by the destination information contained in the event message.

In another embodiment, a method of starting an information-capturing device, comprising the steps of: receiving an event message by a near-field communication technology, wherein the event message includes a destination information; comparing a first identification code of an information-capturing device with the dedicated identification code specified by the destination information contained in the event message; starting the information-capturing device so as for the information-capturing device to begin capturing ambient data, if the first identification code matches the dedicated identification code specified by the destination information contained in the event message; searching a neighboring device checklist by the destination information if the first identification code does not match the dedicated identification code specified by the destination information contained in the event message; and broadcasting the event message by the near-field communication technology if the neighboring device checklist has at least a second identification code matching the dedicated identification code specified by the destination information contained in the event message.

DETAILED DESCRIPTION OF THE EMBODIMENTS

Figure 1:
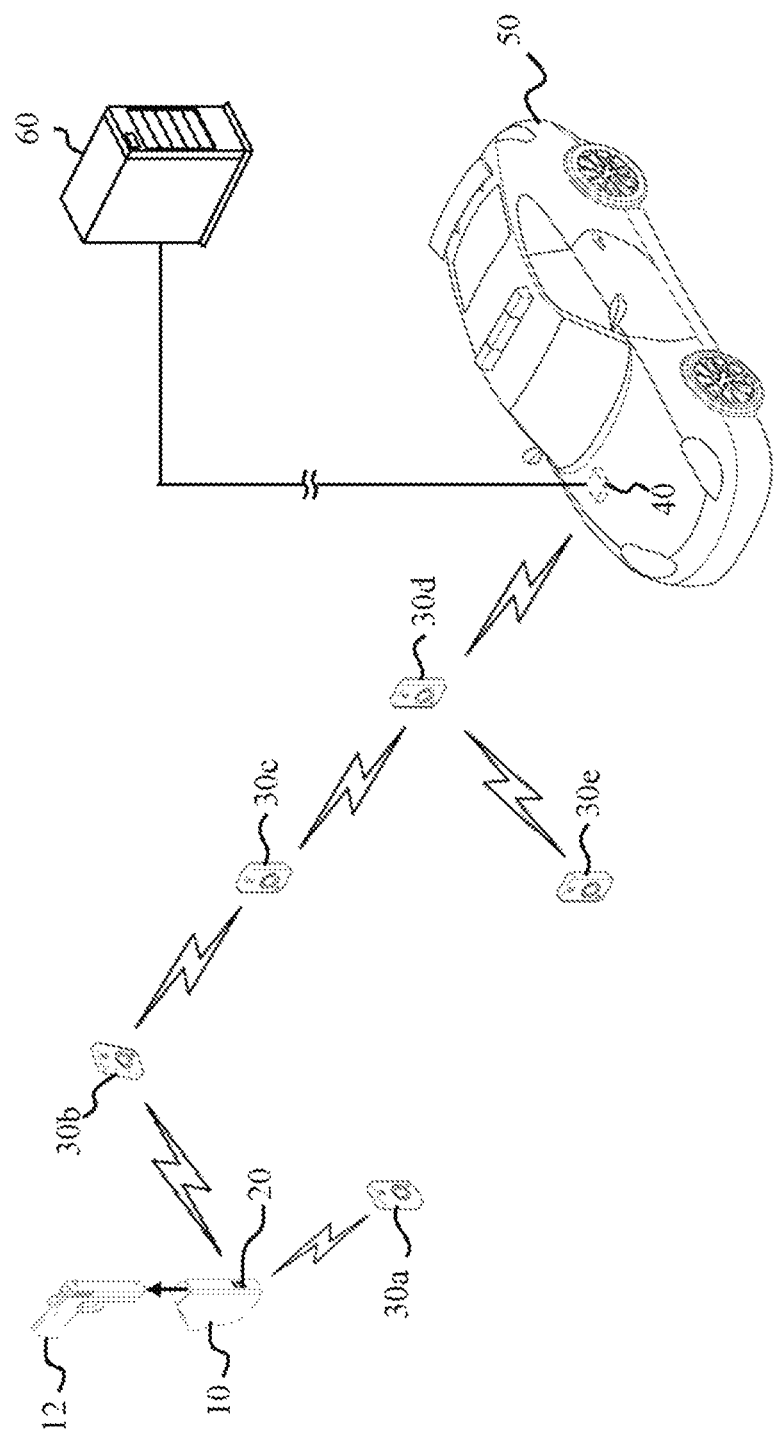
FIG. 1 is a schematic view of the state of an event detecting and recording system according to an embodiment of the present disclosure.
Figure 2:
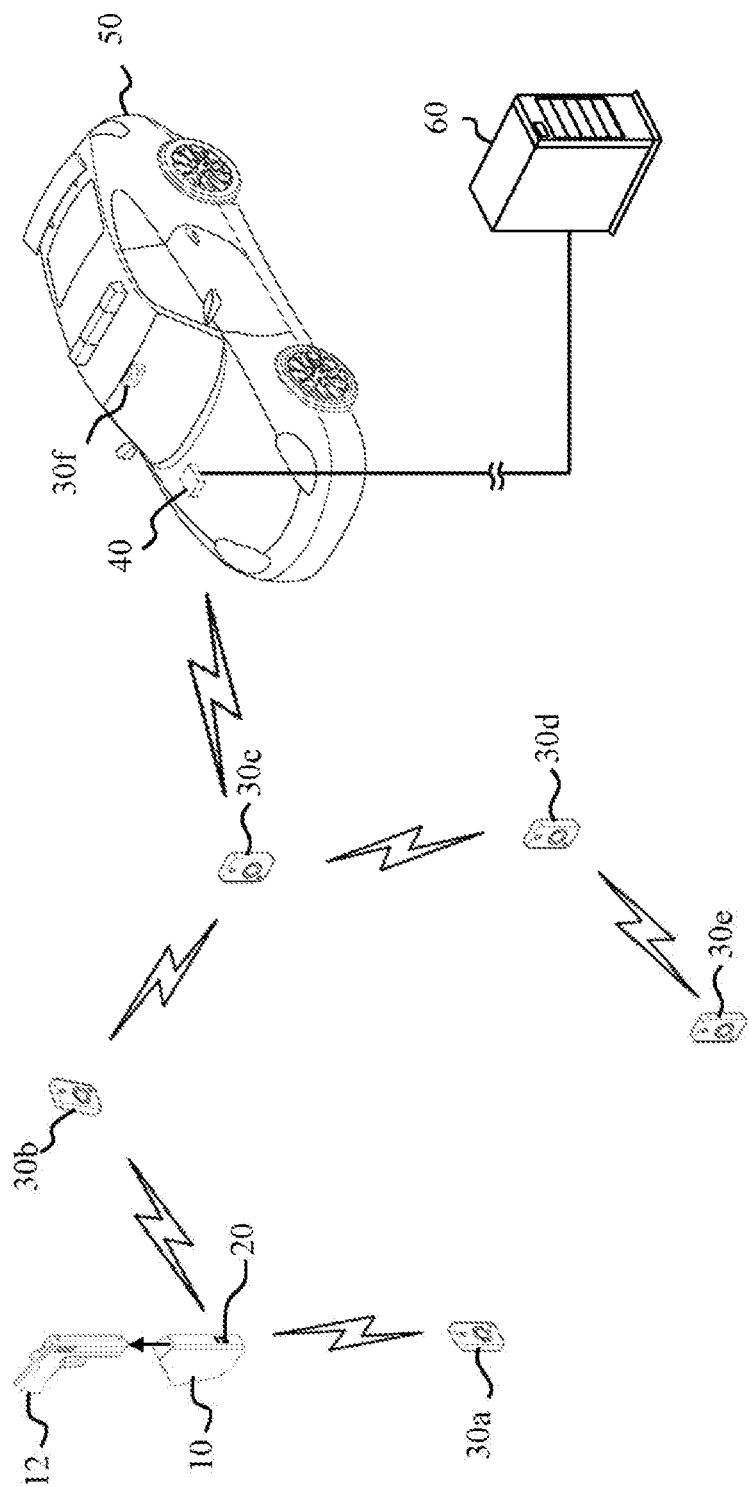
FIG. 2 is a schematic view of the state of the event detecting and recording system according to another embodiment of the present disclosure.

Referring to FIG. 1 and FIG. 2, an event detecting and recording system comprises a state sensor 20, a plurality of information-capturing devices 30a-30f, a trigger box device 40 and a server 60.

The state sensor 20 senses a predetermined operation of a target and generates an event message when the target undergoes the predetermined operation. For instance, assuming that the target is a gun 10, the state sensor 20 is mounted on a holster 12 such that, as soon as a user pulls the gun 10, the state sensor 20 senses the exit of the gun 10 from the holster 12 and thereby generates an event message. The state sensor 120 comprises a metal sensing component. The metal sensing component detects whether the gun 10 is present within a sensing radius of the state sensor 120. In another exemplary embodiment, the state sensor 20 is disposed on an article of jewelry that is worn on a human wrist (for example, a bracelet) or on a human finger (for example, a ring) to sense the exit of the gun 10 from the holster 12 and thereby generates an event message. The state sensor 20 comprises a posture sensing component. The posture sensing component senses whether the human wrist or finger is moving and, if yes, senses for the direction in which the human wrist or finger is moving. In yet another exemplary embodiment, the state sensor 20 detects for a sound of the firing of the gun 10 by sound sampling and generates an event message upon detection of the firing sound.

In some embodiments, the information-capturing devices 30a-30f are normally in a shutdown state, a sleep state, or an idle state and thus will be started only in case of an event to reduce their power consumption and extend their service life. In some embodiments, the information-capturing devices 30a-30e are portable image pickup devices. In some embodiments, the information-capturing device 30f is a stationary image pickup device, such as a dashcam mounted on a vehicle 50.

In some embodiments, the information-capturing devices 30a-30f are not capable of networking, i.e., not equipped with any remote communication module (for example, WIFI module, 3G module, or 4G module), with a view to reducing their power consumption and extending their service life.

Figure 3:
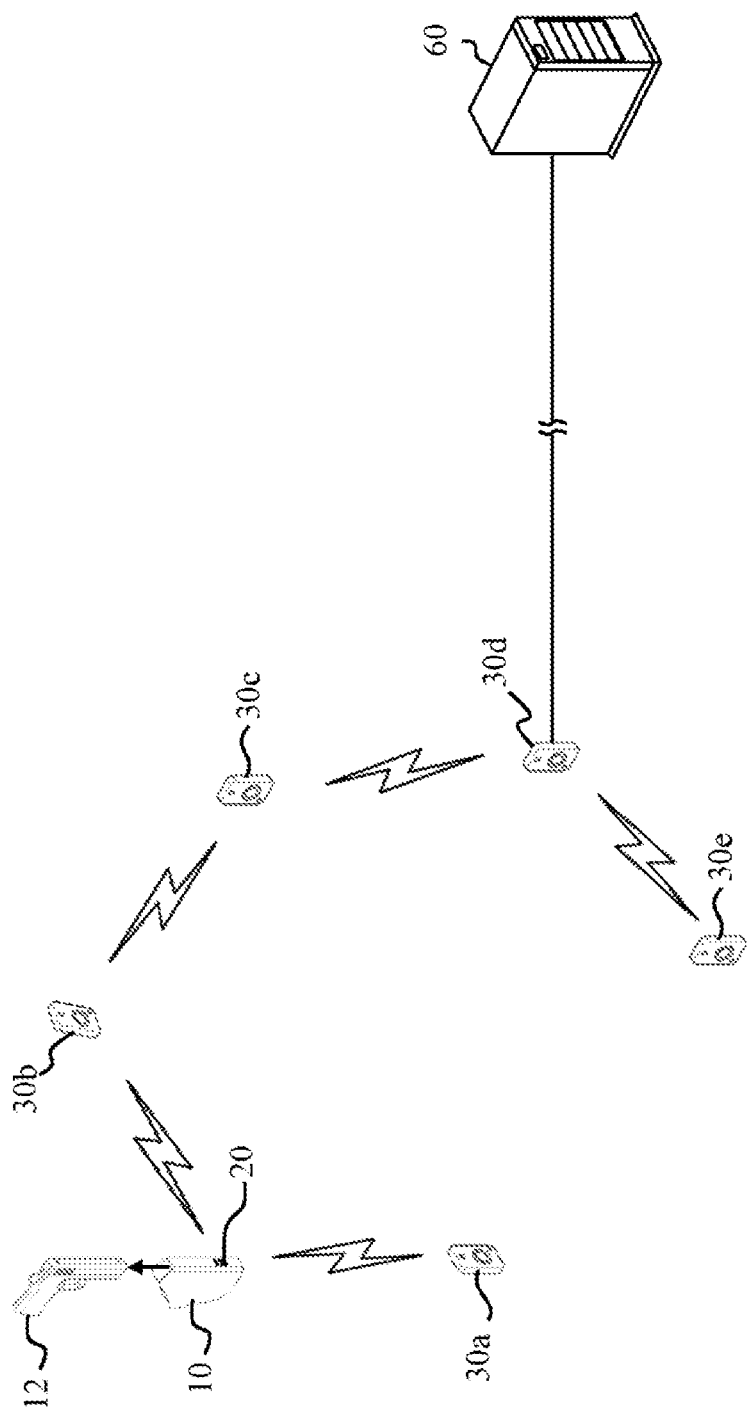
FIG. 3 is a schematic view of the state of the event detecting and recording system according to yet another embodiment of the present disclosure.

In some embodiments illustrated by FIG. 3, among the information-capturing devices 30a-30f, the information-capturing devices 30a-30c, 30e-30f are not capable of networking, whereas the information-capturing device 30d is capable of networking.

The state sensor 20 further comprises a near-field communication module. As soon as an event message is generated, the near-field communication module broadcasts the event message. The event message includes a destination information. For instance, the near-field communication module is a Bluetooth beacon module, and the event message is a beacon signal.

Figure 4:
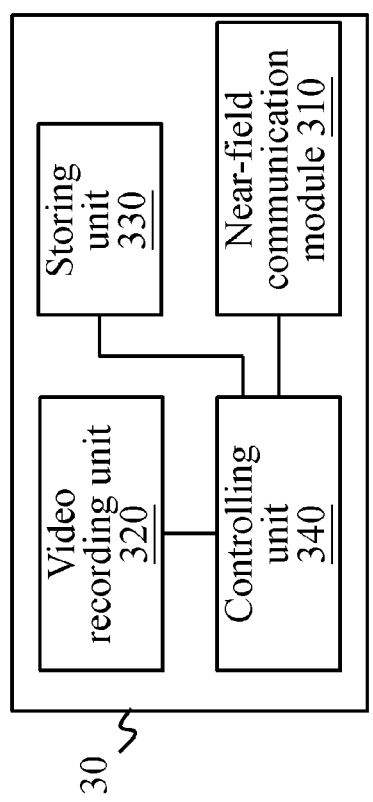
FIG. 4 is a function block diagram of an information-capturing device according to an embodiment of the present disclosure.
Figure 5:
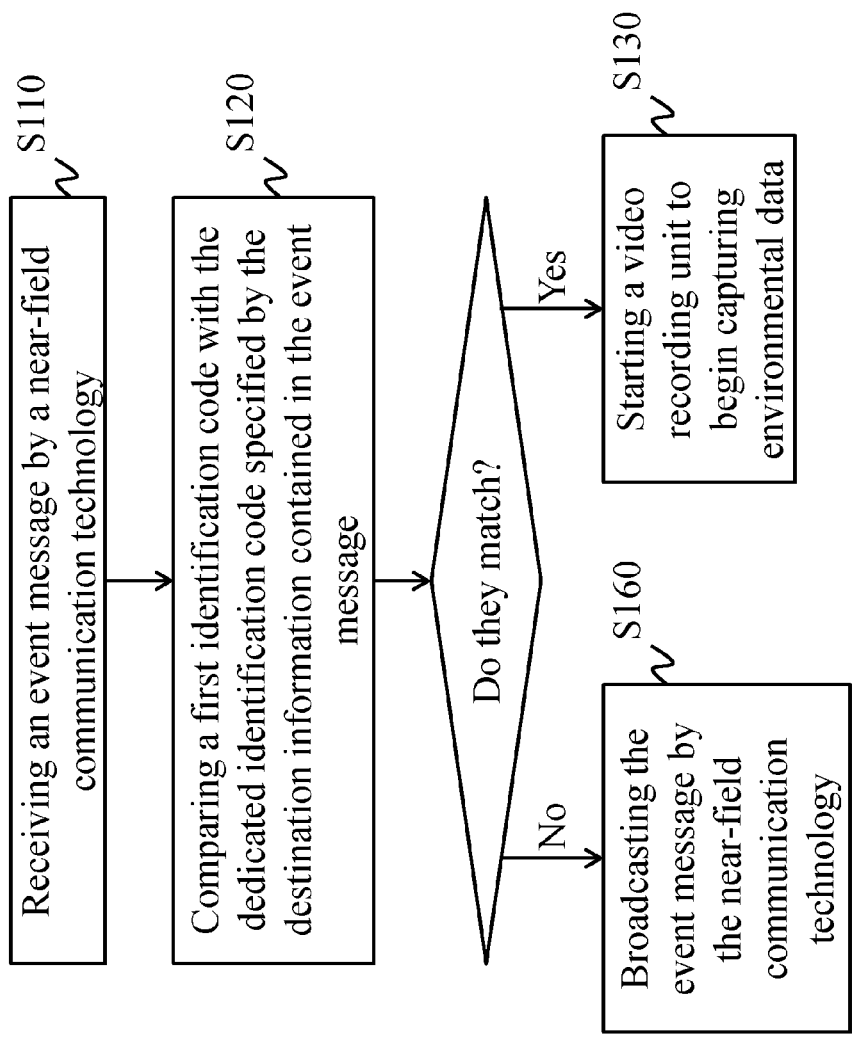
FIG. 5 is a flowchart of a method of starting an information-capturing device according to the first embodiment of the present disclosure.

In some embodiments illustrated by FIG. 4, each information-capturing device 30 (i.e., any one of the information-capturing devices 30a-30f) comprises: a near-field communication module 310, a video recording unit 320, a storing unit 330, and a controlling unit 340. The controlling unit 340 is coupled to the near-field communication module 310, the video recording unit 320, and the storing unit 330. The information-capturing device 30 has an identification code, and the identification code is stored in the storing unit 330 of the information-capturing device 30. In some embodiments, the information-capturing devices 30a-30f have their respective unique identification codes.

For the sake of illustration, the identification code stored in the storing unit 330 of the information-capturing device 30 is hereinafter referred to as the first identification code.

Referring to FIG. 1 through FIG. 5, the information-capturing device 30 receives an event message by a near-field communication technology (step S110), that is, the near-field communication module 310 of the information-capturing device 30 receives the event message broadcast by the state sensor 20. The controlling unit 340 reads the first identification code from the storing unit 330 and then compares the first identification code with the dedicated identification code specified by the destination information contained in the event message contained in the event message (step S120).

In an embodiment, if the first identification code matches the dedicated identification code specified by the destination information contained in the event message, the controlling unit 340 starts the video recording unit 320 (step S130) such that the video recording unit 320 begins capturing ambient data and thus generating a corresponding media file, that is, video recording ambient images and/or sounds. If the first identification code does not match the dedicated identification code specified by the destination information contained in the event message, the information-capturing device 30 broadcasts the event message by a near-field communication technology (step S160); in this regard, the controlling unit 340 sends the received event message out directly by broadcasting through the near-field communication module 310.

In some embodiments, the destination information contained in the event message specifies a dedicated identification code. For instance, the first identification code stored in the information-capturing device 30a is 05, and the first identification code stored in the information-capturing device 30b is 06, but the destination information specifies the dedicated identification code to be 05. The information-capturing devices 30a, 30b are within the signal sensing radius of the state sensor 20, whereas the information-capturing devices 30c-30f are outside the signal sensing radius of the state sensor 20. The information-capturing devices 30a, 30b receive the event message broadcast by the state sensor 20. Since the first identification code 05 stored in the information-capturing device 30a matches the dedicated identification code 05 specified by the destination information contained in the event message, the video recording unit 320 of the information-capturing device 30a starts and begins capturing ambient data. Since the first identification code 06 stored in the information-capturing device 30b does not match the dedicated identification code 05 specified by the destination information contained in the event message, the near-field communication module 310 of the information-capturing device 30b sends the event message out by broadcasting. At this point in time, the information-capturing device 30c which is within the signal sensing radius of the information-capturing device 30b receives the event message broadcast by the information-capturing device 30b. Therefore, the event message is transmitted from the information-capturing device 30b to the information-capturing device 30c. Since the first identification code stored in the information-capturing device 30c does not match the dedicated identification code specified by the destination information contained in the event message, the near-field communication module 310 of the information-capturing device 30c sends the event message out by broadcasting such that the event message is broadcast to the information-capturing devices 30d, 30e which are within the signal sensing radius and then forwarded to the trigger box device 40.

The trigger box device 40 is capable of networking, i.e., equipped with a remote communication module (for example, WIFI module, 3G module, or 4G module.) After receiving the event message, the trigger box device 40 generates a report signal according to the received event message and sends the report signal to a server 60 by a remote communication technology, that is, sending the report signal to the server 60 by a network which the remote communication module connects to. The report signal includes an event message and a position data related to the trigger box device 40. The event message further includes a source information. The source information indicates the identification code of the state sensor 20 which generates the event message. Therefore, the source information contained in the event message included in the report signal informs the server 60 of the place where the event occurs. In some embodiments, the trigger box device 40 is mounted on the vehicle 50 and connected to a network through the Internet of Vehicles (IoV) which the vehicle 50 connects to.

In some embodiments, the destination information contained in the event message specifies some or all of the identification codes. For instance, the first identification code stored in the information-capturing device 30a is 05, and the first identification code stored in the information-capturing device 30b is 06, but the destination information specifies all. After the information-capturing devices 30a, 30b have received the event message, their controlling units 340 determine that the first identification codes match the dedicated identification codes specified by the destination information contained in the event message and thus start the video recording unit 320 so as for the video recording unit 320 to begin capturing ambient data.

In another embodiment, the event message further includes a timestamp, and the timestamp indicates the time at which the state sensor 20 generates the event message. The storing unit 330 of each information-capturing device 30 further stores a time threshold.

Figure 6:
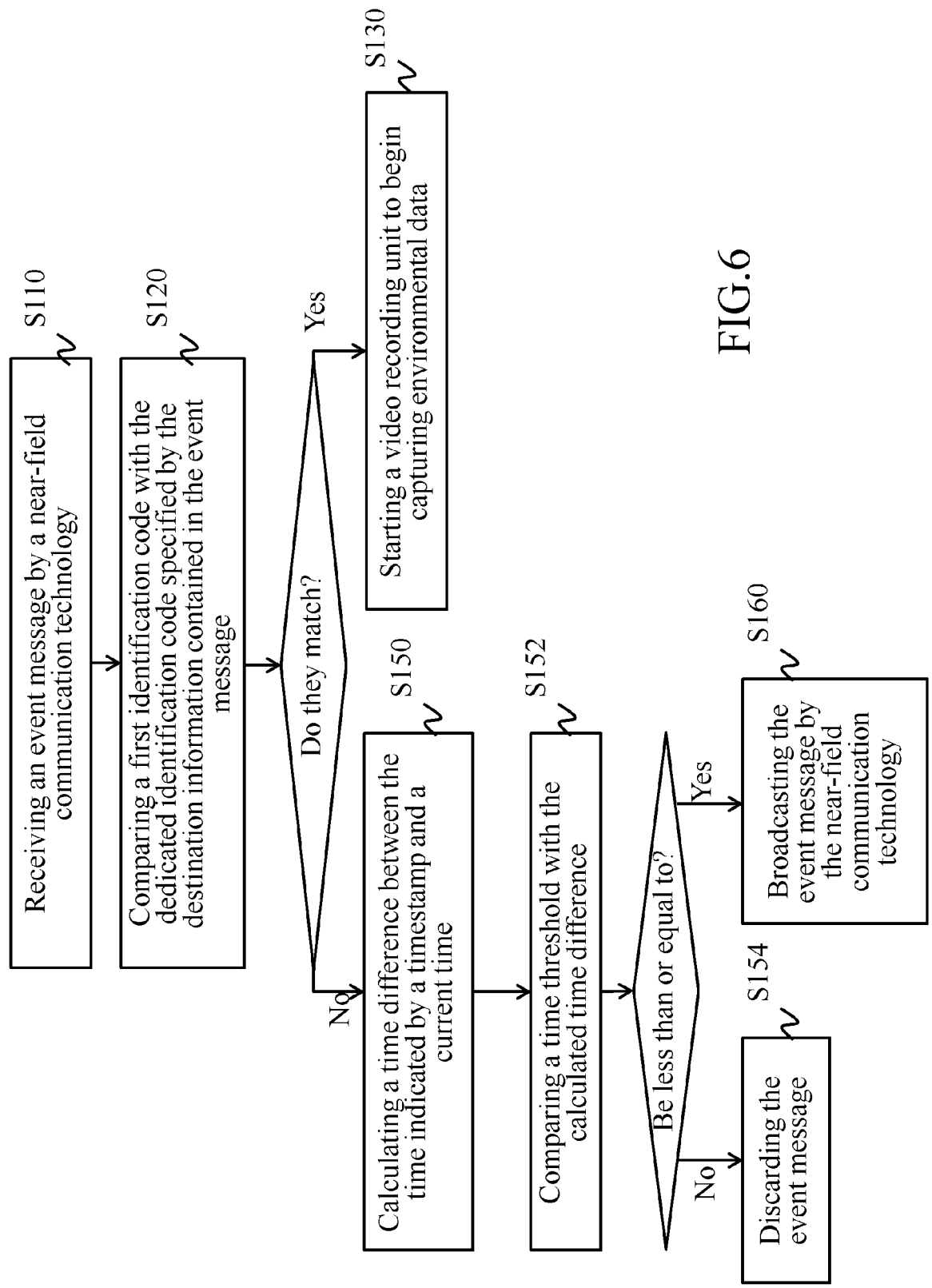
FIG. 6 is a flowchart of the method of starting an information-capturing device according to the second embodiment of the present disclosure.

In an embodiment illustrated by FIG. 6, if the first identification code matches the dedicated identification code specified by the destination information contained in the event message, the controlling unit 340 starts the video recording unit 320 (step S130) such that the video recording unit 320 begins capturing an ambient data and thus generating a corresponding media file, that is, video recording ambient images and/or sounds. If the first identification code does not match the dedicated identification code specified by the destination information contained in the event message, the controlling unit 340 of the information-capturing device 30 calculates the time difference between the time indicated by the timestamp in the event message and the current time (step S150) and then compares the time threshold with the calculated time difference (step S152). If the time indicated by the timestamp is greater than the time threshold, the controlling unit 340 discards the received event message (step S154), and thus does not perform the step of broadcasting the event message (i.e., does not perform step S160.) If the time indicated by the timestamp is less than or equal to the time threshold, the controlling unit 340 broadcasts the event message by a near-field communication technology (step S160), in this regard, the controlling unit 340 sends the received event message out directly by broadcasting through the near-field communication module 310. For instance, assuming that the time threshold is 10 minutes, if the time difference between the time of generating the event message and the current time (that is, the time difference between the time indicated by the timestamp and the current time) exceeds 10 minutes, the controlling unit 340 discards the received event message. Conversely, if the time difference between the time of generating the event message and the current time (that is, the time difference between the time indicated by the timestamp and the current time) is less than or equal to 10 minutes, the controlling unit 340 broadcasts the event message by a near-field communication technology.

In yet another embodiment, the event message further includes a position data, and the position data indicates a geographic position at which the state sensor 20 generates the event message. In this regard, the storing unit 330 of each information-capturing device 30 further stores a distance threshold.

Figure 7:
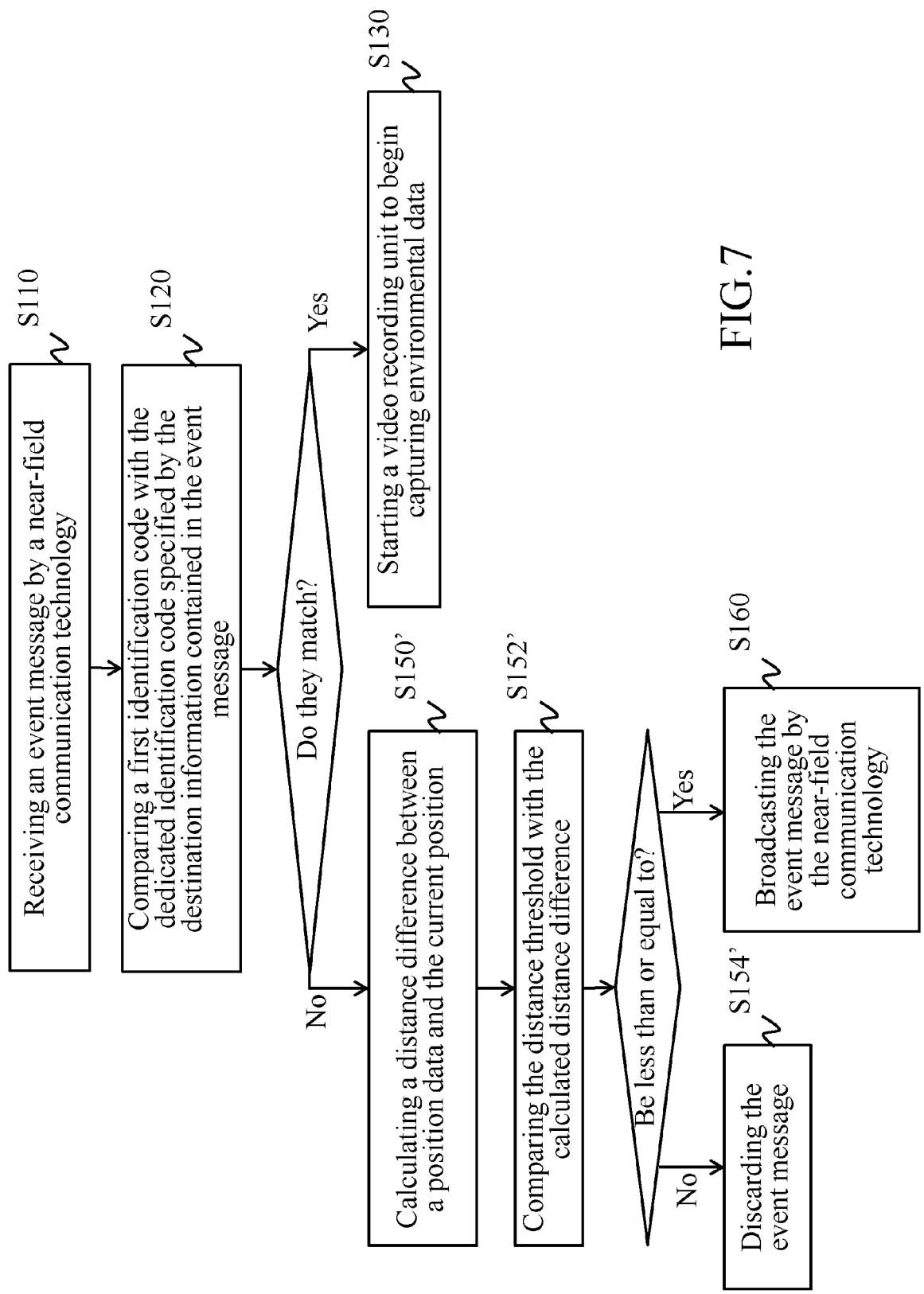
FIG. 7 is a flowchart of the method of starting an information-capturing device according to the third embodiment of the present disclosure.

Referring to FIG. 7, if the first identification code matches the dedicated identification code specified by the destination information contained in the event message, the controlling unit 340 starts the video recording unit 320 (step S130) such that the video recording unit 320 begins capturing an ambient data and thus generating a corresponding media file, that is, video recording ambient images and/or sounds. If the first identification code does not match the dedicated identification code specified by the destination information contained in the event message, the controlling unit 340 of the information-capturing device 30 calculates the distance difference between the geographic position indicated by the position data contained in the event message and the current position (step S150') and then compares the distance threshold with the calculated distance difference (step S152'). If the distance difference is greater than the distance threshold, the controlling unit 340 discards the received event message (step S154'), that is, does not perform the step of broadcasting the event message (i.e., does not perform step S160.) If the distance difference is less than or equal to the distance threshold, the controlling unit 340 broadcasts the event message by a near-field communication technology (step S160); in this regard, the controlling unit 340 sends the received event message out directly by broadcasting through the near-field communication module 310.

In some embodiments, the storing unit 330 of each information-capturing device 30 further stores a neighboring device checklist. The neighboring device checklist records the identification codes of the other information-capturing devices 30 in the vicinity of the information-capturing device 30. For the sake of illustration, the identification codes recorded in the neighboring device checklist are hereinafter referred to as second identification codes.

Figure 8:
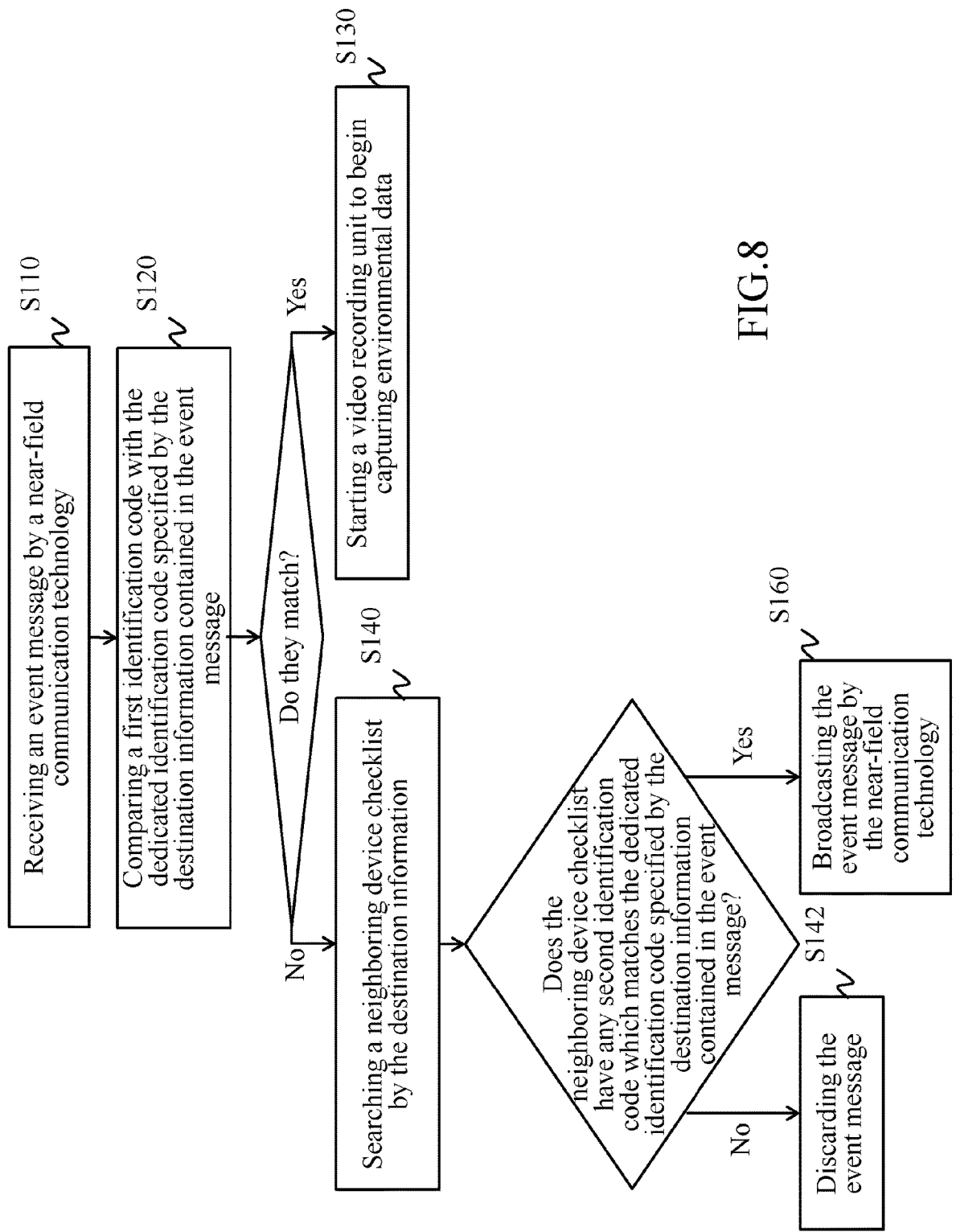
FIG. 8 is a flowchart of another method of starting an information-capturing device according to the fourth embodiment of the present disclosure.

Referring to FIG. 8, if the first identification code matches the dedicated identification code specified by the destination information contained in the event message, the controlling unit 340 starts the video recording unit 320 (step S130) such that the video recording unit 320 begins capturing an ambient data and thus generating a corresponding media file, that is, video recording ambient images and/or sounds. If the first identification code does not match the dedicated identification code specified by the destination information contained in the event message, the controlling unit 340 of the information-capturing device 30 searches a neighboring device checklist by the destination information contained in the event message (step S140). If the neighboring device checklist has one or more second identification codes which match the dedicated identification code specified by the destination information contained in the event message, the information-capturing device 30 broadcasts the received event message by a near-field communication technology (step S160), in this regard, the controlling unit 340 sends the received event message out directly by broadcasting through the near-field communication module 310. Conversely, if the neighboring device checklist does not have one or more second identification codes which match the dedicated identification code specified by the destination information contained in the event message, the controlling unit 340 of the information-capturing device 30 discards the received event message (step S142).

In another embodiment, the event message further includes a timestamp, and the timestamp indicates the time at which the state sensor 20 generates the event message. In this regard, the storing unit 330 of each information-capturing device 30 further stores a time threshold.

Figure 9:
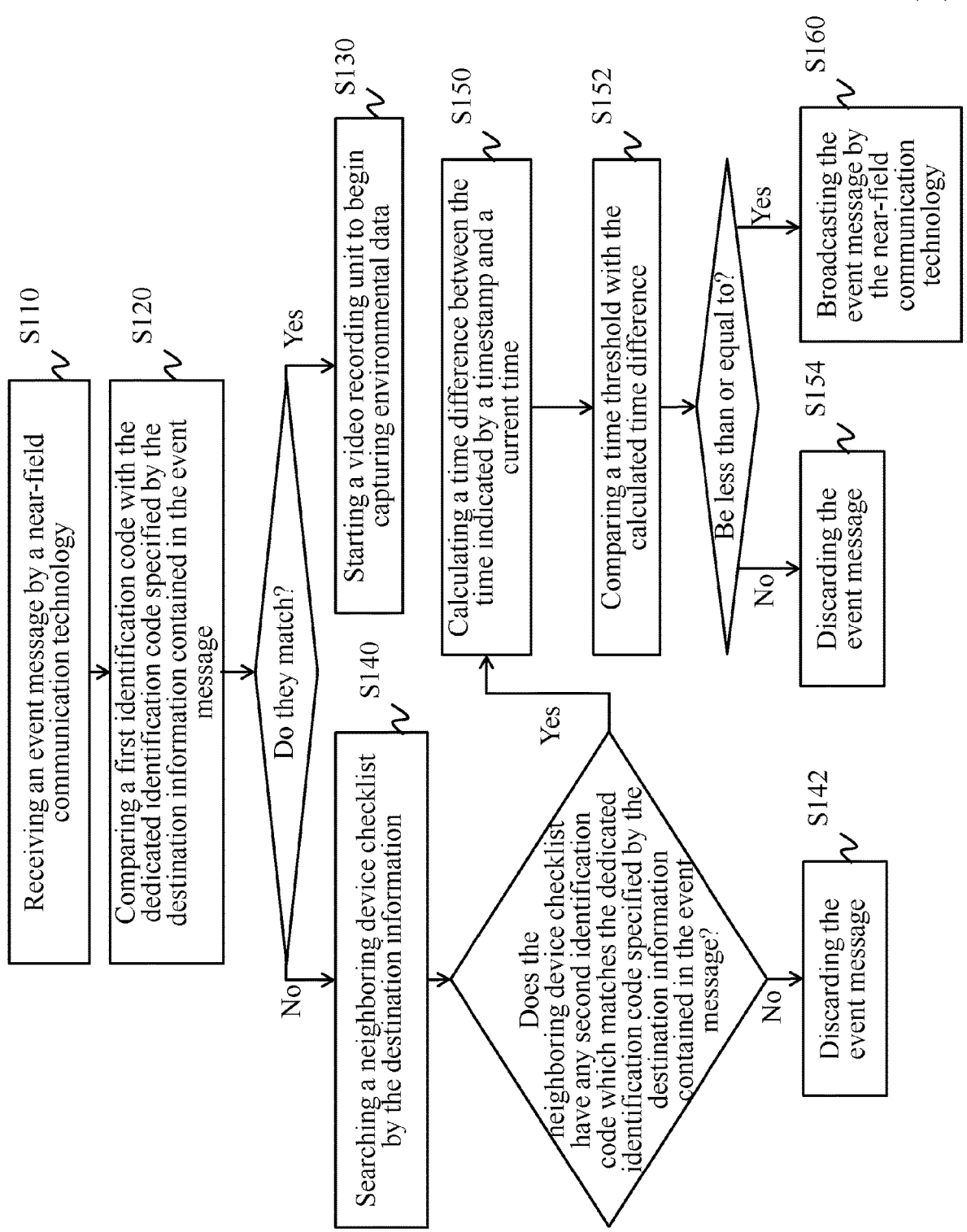
FIG. 9 is a flowchart of the other method of starting an information-capturing device according to the fifth embodiment of the present disclosure.

In an exemplary embodiment illustrated by FIG. 9, if the neighboring device checklist has one or more second identification codes which match the dedicated identification code specified by the destination information contained in the event message, the controlling unit 340 of the information-capturing device 30 calculates the time difference between the time indicated by the timestamp contained in the event message and the current time (step S150) and then compares the time threshold with the calculated time difference (step S152). If the time indicated by the timestamp is greater than the time threshold, the controlling unit 340 discards the received event message (step S154), that is, does not perform the step of broadcasting the event message (i.e., does not perform step S160.) If the time indicated by the timestamp is less than or equal to the time threshold, the controlling unit 340 broadcasts the event message by a near-field communication technology (step S160), in this regard, the controlling unit 340 sends the received event message out directly by broadcasting through the near-field communication module 310.

Figure 10:
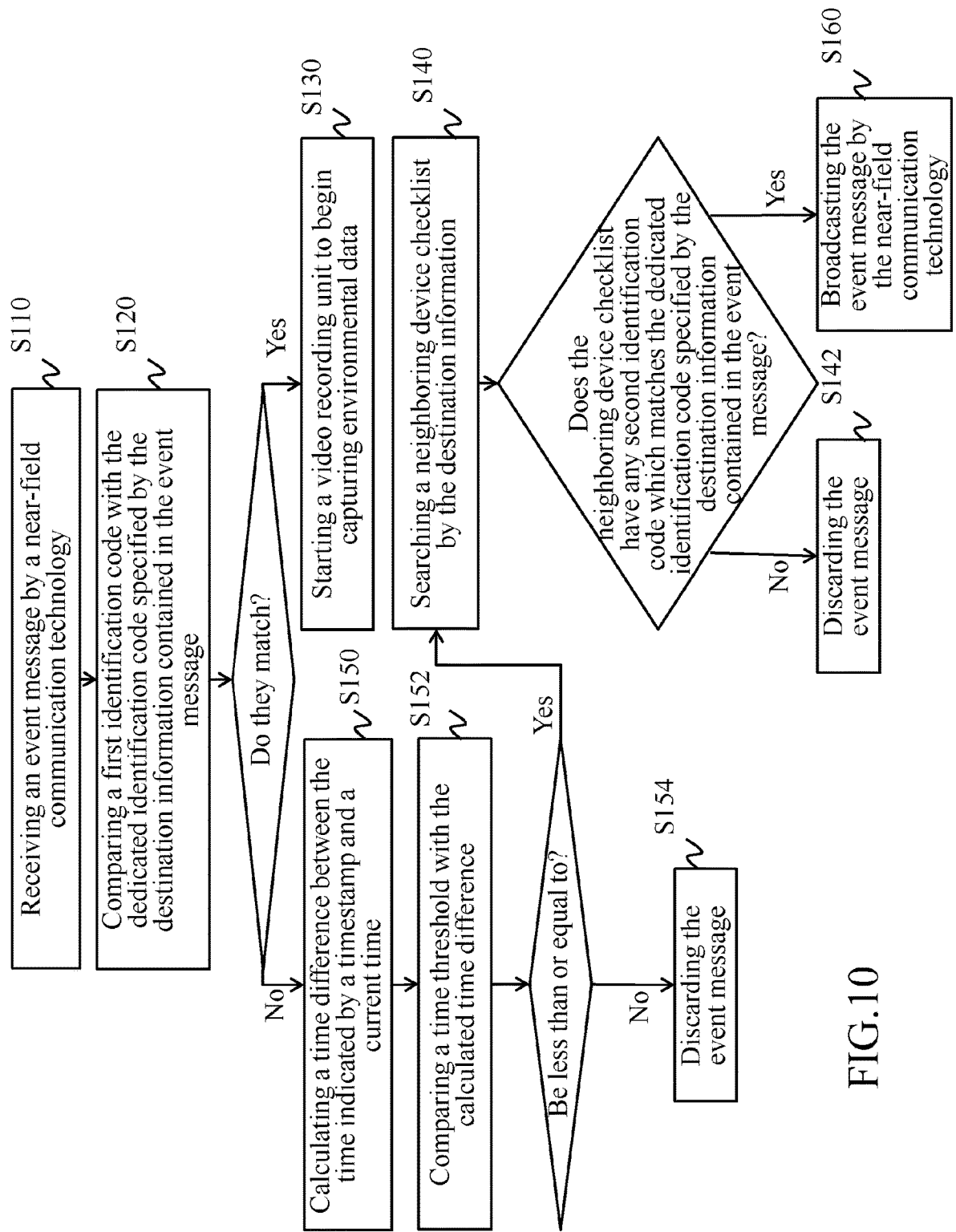
FIG. 10 is a flowchart of the other method of starting an information-capturing device according to the sixth embodiment of the present disclosure.

In another exemplary embodiment illustrated by FIG. 10, if the first identification code does not match the dedicated identification code specified by the destination information contained in the event message, the controlling unit 340 of the information-capturing device 30 calculates the time difference between the time indicated by the timestamp in the event message and the current time (step S150) and then compares the time threshold with the calculated time difference (step S152). If the time indicated by the timestamp is greater than the time threshold, the controlling unit 340 discards the received event message (step S154), that is, does not perform the step of broadcasting the event message (i.e., does not perform step S160.) If the time indicated by the timestamp is less than or equal to the time threshold, the controlling unit 340 searches a neighboring device checklist by the destination information contained in the event message (step S140). If the neighboring device checklist has one or more second identification codes which match the dedicated identification code specified by the destination information contained in the event message, the information-capturing device 30 broadcasts the event message by a near-field communication technology (step S160), in this regard, the controlling unit 340 sends the received event message out directly by broadcasting through the near-field communication module 310.

In yet another embodiment, the event message further includes a position data, and the position data indicates a geographic position at which the state sensor 20 generates the event message. In this regard, the storing unit 330 of each information-capturing device 30 further stores a distance threshold.

Figure 11:
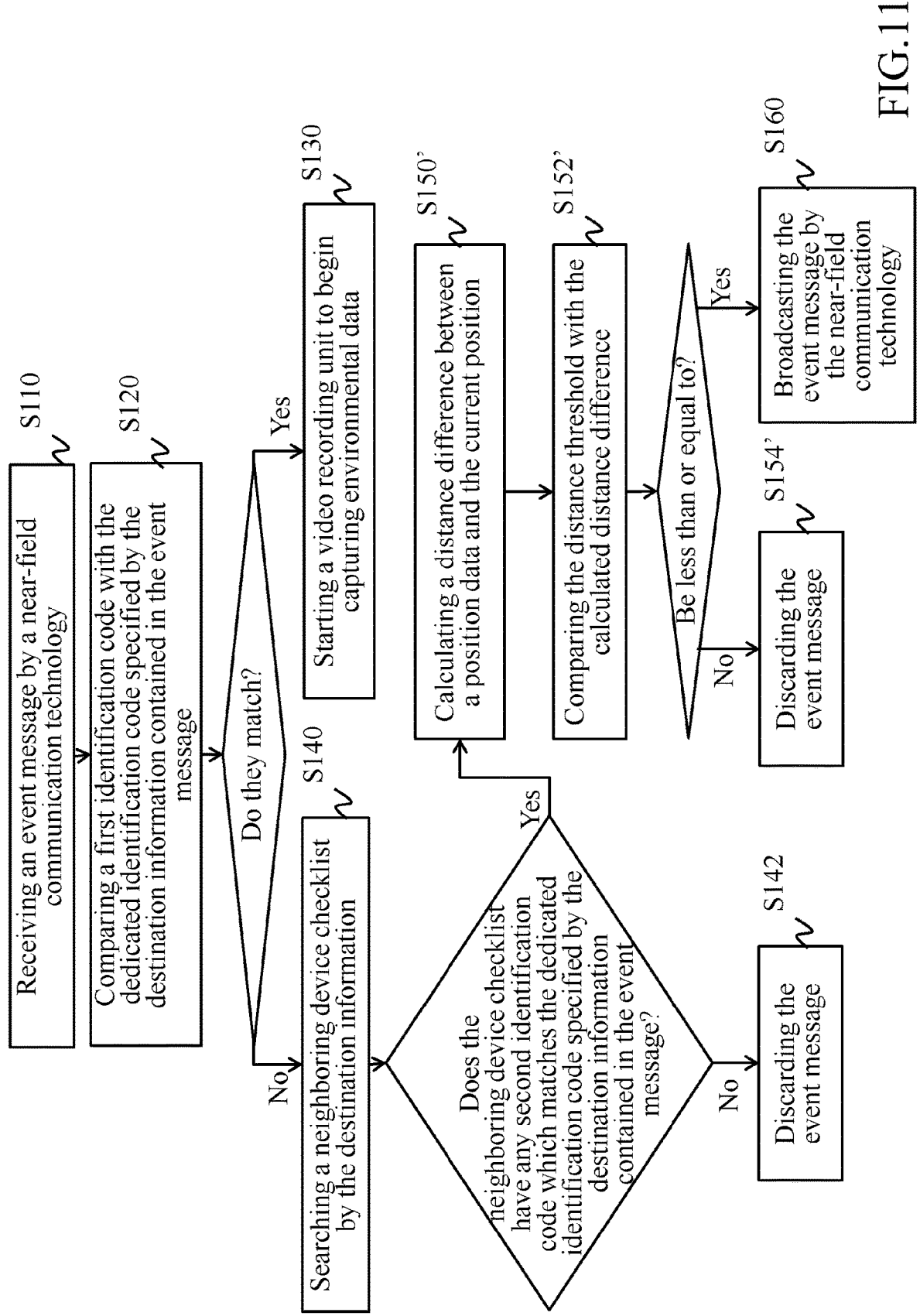
FIG. 11 is a flowchart of the other method of starting an information-capturing device according to the seventh embodiment of the present disclosure.

In an exemplary embodiment illustrated by FIG. 11, if the neighboring device checklist has one or more second identification codes which match the dedicated identification code specified by the destination information contained in the event message, the controlling unit 340 of the information-capturing device 30 calculates the distance difference between the geographic position indicated by the position data contained in the event message and the current position (step S150') and then compares the distance threshold with the calculated distance difference (step S152'). If the distance difference is greater than the distance threshold, the controlling unit 340 discards the received event message (step S154'), that is, does not perform the step of broadcasting the event message (i.e., does not perform step S160.) If the distance difference is less than or equal to the distance threshold, the information-capturing device 30 broadcasts the event message by a near-field communication technology (step S160); in this regard, the controlling unit 340 sends the received event message out directly by broadcasting through the near-field communication module 310. Conversely, if the neighboring device checklist does not have one or more second identification codes which match the dedicated identification code specified by the destination information contained in the event message, the controlling unit 340 of the information-capturing device 30 discards the received event message (step S142).

Figure 12:
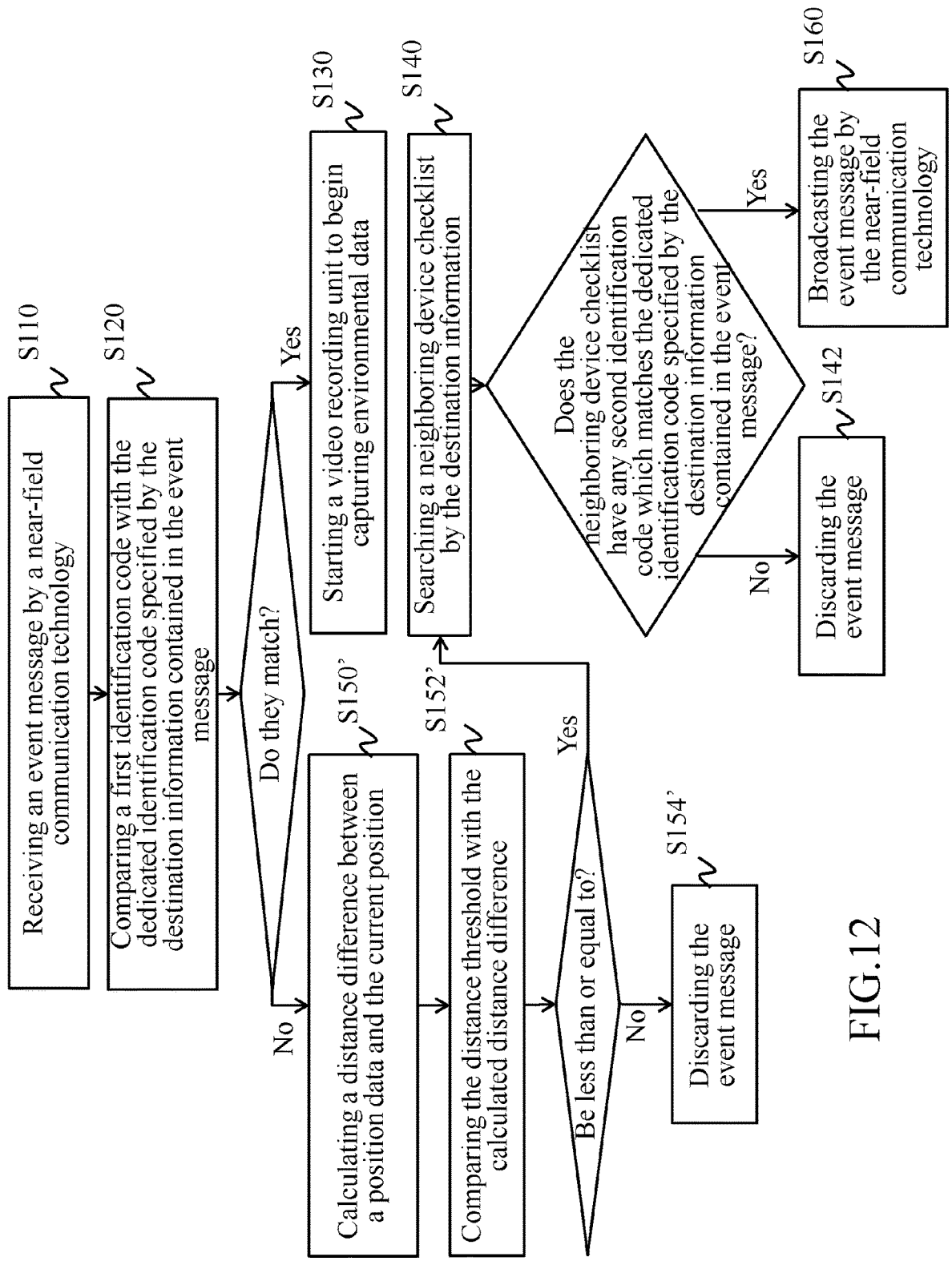
FIG. 12 is a flowchart of the other method of starting an information-capturing device according to the eighth embodiment of the present disclosure.

In another exemplary embodiment illustrated by FIG. 12, if the first identification code does not match the dedicated identification code specified by the destination information contained in the event message, the controlling unit 340 of the information-capturing device 30 calculates the distance difference between the geographic position indicated by the position data contained in the event message and the current position (step S150') and then compares the distance threshold with the calculated distance difference (step S152'). If the distance difference is greater than the distance threshold, the controlling unit 340 discards the received event message (step S154'), that is, does not perform the step of broadcasting the event message (i.e., does not perform step S160.) If the distance difference is less than or equal to the distance threshold, the controlling unit 340 searches a neighboring device checklist by the destination information contained in the event message (step S140). If the neighboring device checklist has one or more second identification codes which match the dedicated identification code specified by the destination information contained in the event message, the information-capturing device 30 broadcasts the event message by a near-field communication technology (step S160); in this regard, the controlling unit 340 sends the received event message out directly by broadcasting through the near-field communication module 310.

Figure 13:
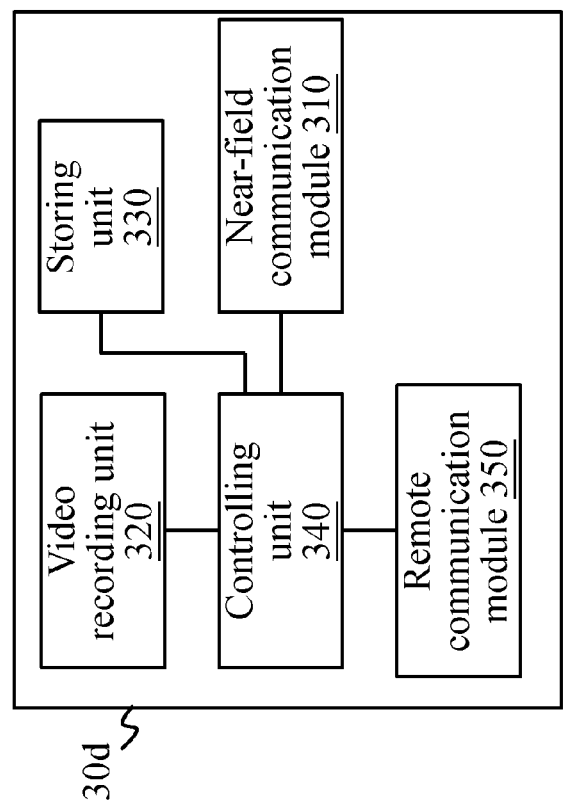
FIG. 13 is a function block diagram of the information-capturing device according to another embodiment of the present disclosure.
Figure 14:
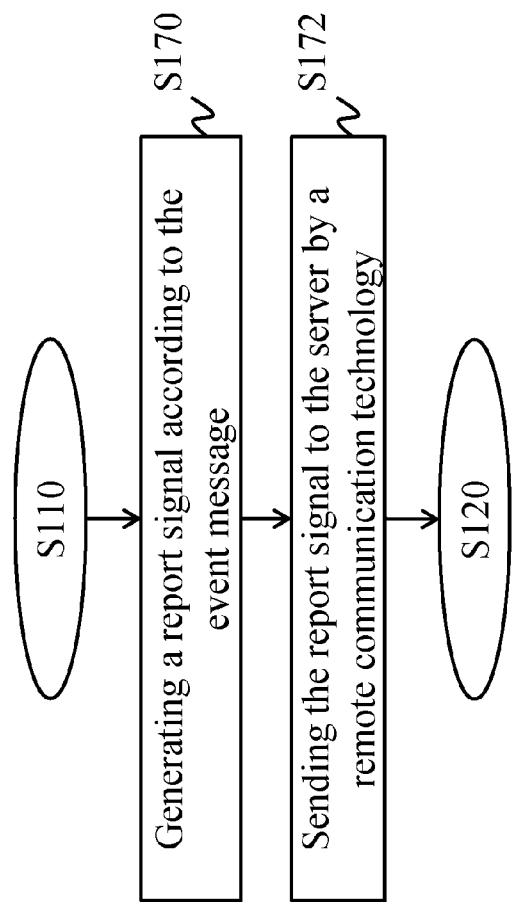
FIG. 14 is a flowchart of the other method of starting an information-capturing device according to some embodiments of the present disclosure.

In some embodiments illustrated by FIG. 3, FIG. 13 and FIG. 14, if the information-capturing device 30d receiving an event message has a remote communication module 350, the controlling unit 340 generates a report signal according to the event message (step S170), and then the remote communication module 350 sends the report signal to the server 60 by a remote communication technology (step S172). The report signal includes an event message and the position data of the trigger box device 40. The event message further includes a source information. The source information indicates the identification code of the state sensor 20 generating the event message. Therefore, the source information contained in the event message included in the report signal informs the server 60 of the place where the event occurs.

Although the steps of the method of the present disclosure are described above as performed in specific order, the order is not restrictive of the present disclosure. Persons skilled in the art understand that in a reasonable situation some of the steps may be performed simultaneously or in reverse order.

In some embodiments, the destination information contained in the event message generated by the state sensor 20 is preset by an electronic device and stored in the storing unit 330. Therefore, in a preset state, the state sensor 20 communicates with the electronic device in a wired or wireless manner. Afterward, the electronic device generates a preset value of the destination information and sends the preset value to the state sensor 20. The state sensor 20 sets, according to the received preset value, one or more specified identification codes for the destination information when generating the event message.

In an embodiment, the identification code of the information-capturing device 30 is preset for delivery and stored in the storing unit 330 of the information-capturing device 30. In another embodiment, the identification code of the information-capturing device 30 is preset by an electronic device and stored in the storing unit 330 of the information-capturing device 30. Therefore, in a preset state, the information-capturing device 30 communicates with the electronic device in a wired or wireless manner. Afterward, the electronic device generates and sends a preset value of an identification code to the information-capturing device 30.

In an embodiment, the aforesaid thresholds (the time threshold and the distance threshold) are preset for delivery and stored in the storing unit 330 of the information-capturing device 30. In another embodiment, the aforesaid thresholds are preset by an electronic device and stored in the storing unit 330 of the information-capturing device 30. Therefore, in a preset state, information-capturing device 30 communicates with the electronic device in a wired or wireless manner. Afterward, the electronic device generates and sends a preset value of a threshold to the information-capturing device 30.

In an embodiment, the neighboring device checklist is compiled by the server 60, loaded to each information-capturing device 30, and finally stored in the storing unit 330 of the information-capturing device 30. Therefore, each information-capturing device 30 sends its position data and its identification code to the server 60. The server 60 compiles a neighboring device checklist according to the position data of each information-capturing device 30 and identification codes of the information-capturing devices 30 within a predetermined sensing radius of the position data of each information-capturing device 30, and then sends the neighboring device checklist to the corresponding information-capturing device 30. For instance, the information-capturing device 30 capable of networking regularly communicates with the server 60 through a network and thus updates its position data, receives and records the neighboring device checklist compiled according to identification codes of the other information-capturing devices 30 within a predetermined sensing radius of the updated position data. The information-capturing device 30 not capable of networking sends its position data to the neighboring electronic device capable of networking by a near-field communication technology or in a wired manner so as for the position data to be sent to the server 60, and then receives the returned neighboring device checklist.

In some embodiments, the storing unit is implemented as one or more storage components. The storage components are each, for example, a memory or a register, but the present disclosure is not limited thereto.

In some embodiments, the near-field communication module is, for example, a Bluetooth module, but the present disclosure is not limited thereto.

In some embodiments, the controlling unit is implemented as one or more processing components. Each processing component is a microprocessor, a microcontroller, a digital signal processor, a central processing unit (CPU), a programmable logic controller, a state indicator, or any analog and/or digital device operating signals according to operation commands.

In some embodiments, the video recording unit is implemented as an image pickup lens and an image processing unit. In an exemplary embodiment, the image processing unit is an image signal processor (ISP). In another exemplary embodiment, the image processing unit and the controlling unit are implemented as the same chip.

In conclusion, an embodiment of the present disclosure provides a method of starting an information-capturing device wirelessly, as opposed to manually, as soon as an event occurs in the vicinity of the information-capturing device, so as for the information-capturing device to record ambient images and/or sounds automatically and instantly. Some other embodiments of the present disclosure provide another method of starting an information-capturing device capable of informing a remote server of an event through a neighboring device which supports a remote communication technology.

What is claimed is:

1. A method of starting an information-capturing device, comprising the steps of:
    receiving an event message including a destination information by a near-field communication technology;
    comparing a first identification code of the information-capturing device with the dedicated identification code specified by the destination information contained in the event message, wherein the first identification code is an identifier of the information-capturing device;
    starting the information-capturing device so as for the information-capturing device to begin capturing ambient data in response to the first identification code matching the dedicated identification code specified by the destination information contained in the event message; and
    broadcasting the event message by the near-field communication technology in response to the first identification code not matching the dedicated identification code specified by the destination information contained in the event message.

2. The method of starting an information-capturing device according to claim 1, further comprising:
    generating a report signal according to the event message, wherein the report signal includes the event message and a position data of the information-capturing device; and
    sending the report signal to a server by a remote communication technology.

3. The method of starting an information-capturing device according to claim 1, wherein, in response to the first identification code matching the dedicated identification code specified by the destination information contained in the event message, the method further comprises:
    generating a report signal according to the event message, wherein the report signal includes the event message and a position data of the information-capturing device; and
    sending the report signal to a server by a remote communication technology.

4. The method of starting an information-capturing device according to claim 1, wherein the first identification code is a unique identifier of the information-capturing device.

5. A method of starting an information-capturing device, comprising the steps of:
- receiving an event message by a near-field communication technology, wherein the event message includes a destination information;
- comparing a first identification code of an information-capturing device with the dedicated identification code specified by the destination information contained in the event message, wherein the first identification code is an identifier of the information-capturing device;
- starting the information-capturing device so as for the information-capturing device to begin capturing ambient data in response to the first identification code matching the dedicated identification code specified by the destination information contained in the event message;
- searching a neighboring device checklist by the destination information in response to the first identification code not matching the dedicated identification code specified by the destination information contained in the event message; and
- broadcasting the event message by the near-field communication technology in response to the neighboring device checklist having at least a second identification code matching the dedicated identification code specified by the destination information contained in the event message.

6. The method of starting an information-capturing device according to claim 5, further comprising:
- generating a report signal according to the event message, wherein the report signal includes the event message and a position data of the information-capturing device; and
- sending the report signal to a server by a remote communication technology.

7. The method of starting an information-capturing device according to claim 5, wherein, in response to the first identification code matching the dedicated identification code specified by the destination information contained in the event message, the method further comprises:
- generating a report signal according to the event message, wherein the report signal includes the event message and a position data of the information-capturing device; and
- sending the report signal to a server by a remote communication technology.

8. The method of starting an information-capturing device according to claim 5, wherein the first identification code is a unique identifier of the information-capturing device.

9. A method of starting an information-capturing device, comprising the steps of:
- receiving an event message including a destination information by a near-field communication technology;
- comparing a first identification code of the information-capturing device with the dedicated identification code specified by the destination information contained in the event message, wherein the first identification code is an identifier of the information-capturing device;
- starting the information-capturing device so as for the information-capturing device to begin capturing ambient data in response to the first identification code matching the dedicated identification code specified by the destination information contained in the event message; and
- in response to the first identification code not matching the dedicated identification code specified by the destination information contained in the event message, performing the steps of:
  - determining whether a predetermined condition is met; and
  - discarding the event message in response to the predetermined condition not being met; and
  - in response to the predetermined condition being met, performing the step of broadcasting the event message by the near-field communication technology.

10. The method of starting an information-capturing device according to claim 9, wherein the event message further includes a timestamp, and the step of determining whether the predetermined condition is met comprises:
- calculating a time difference between a time indicated by the timestamp and a current time; and
- comparing the time difference with a time threshold;
- wherein the predetermined condition is not met when the time difference is greater than the time threshold; and
- the predetermined condition is met when the time difference is less than or equal to the time threshold.

11. The method of starting an information-capturing device according to claim 9, wherein the event message further includes a position data of the information-capturing device, and the step of determining whether the predetermined condition is met comprises:
- calculating a distance difference between the position data and a current position; and
- comparing a distance threshold with the distance difference;
- wherein the predetermined condition is not met when the distance difference is greater than the distance threshold; and
- the predetermined condition is met when the distance difference is less than or equal to the distance threshold.

12. The method of starting an information-capturing device according to claim 9, wherein the first identification code is a unique identifier of the information-capturing device.

13. A method of starting an information-capturing device, comprising the steps of:
- receiving an event message by a near-field communication technology, wherein the event message includes a destination information;
- comparing a first identification code of an information-capturing device with the dedicated identification code specified by the destination information contained in the event message, wherein the first identification code is an identifier of the information-capturing device;
- starting the information-capturing device so as for the information-capturing device to begin capturing ambient data in response to the first identification code matching the dedicated identification code specified by the destination information contained in the event message;
- searching a neighboring device checklist by the destination information in response to the first identification code not matching the dedicated identification code specified by the destination information contained in the event message; and
- in response to the first identification code not matching the dedicated identification code specified by the destination information contained in the event message, performing the steps of:
  - determining whether a predetermined condition is met; and discarding the event message in response to the predetermined condition not being met; and in response to the predetermined condition being met, performing the step of broadcasting the event message by the near-field communication technology in response to the neighboring device checklist having at least a second identification code matching the dedicated identification code specified by the destination information contained in the event message.

14. The method of starting an information-capturing device according to claim 13, wherein the event message includes a timestamp, and the step of determining whether the predetermined condition is met comprises:

calculating a time difference between a time indicated by the timestamp and a current time; and comparing the time difference with a time threshold;

wherein the predetermined condition is not met when the time difference is greater than the time threshold; and the predetermined condition is met when the time difference is less than or equal to the time threshold.

15. The method of starting an information-capturing device according to claim 13, wherein the event message further includes a position data of the information-capturing device, and the step of determining whether the predetermined condition is met comprises:

calculating a distance difference between the position data and a current position; and comparing a distance threshold with the distance difference;

wherein the predetermined condition is not met when the distance difference is greater than the distance threshold; and the predetermined condition is met when the distance difference is less than or equal to the distance threshold.

16. The method of starting an information-capturing device according to claim 13, wherein the first identification code is a unique identifier of the information-capturing device.

* * * * *